US011281019B2

(12) United States Patent
Otomo et al.

(10) Patent No.: US 11,281,019 B2
(45) Date of Patent: Mar. 22, 2022

(54) LENS DRIVING DEVICE

(71) Applicant: ALPS ALPINE CO., LTD., Tokyo (JP)

(72) Inventors: Katsuhiko Otomo, Miyagi (JP);
Masayoshi Nakagawa, Miyagi (JP);
Hideaki Sato, Miyagi (JP); Hidemitsu
Sato, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 313 days.

(21) Appl. No.: 16/526,109

(22) Filed: Jul. 30, 2019

(65) Prior Publication Data

US 2019/0353921 A1 Nov. 21, 2019

Related U.S. Application Data

(63) Continuation of application No. PCT/JP2018/002540, filed on Jan. 26, 2018.

(30) Foreign Application Priority Data

Feb. 8, 2017 (JP) .............................. JP2017-020974

(51) Int. Cl.
G02B 27/64 (2006.01)
G03B 5/02 (2021.01)

(52) U.S. Cl.
CPC ............. G02B 27/646 (2013.01); G03B 5/02 (2013.01); G03B 2205/0015 (2013.01)

(58) Field of Classification Search
CPC . G03B 27/646; G03B 5/02; G03B 2205/0015
See application file for complete search history.

(56) References Cited

U.S. PATENT DOCUMENTS 9,500,878 B2    11/2016 Sugawara
2012/0229926 A1  9/2012 Wade et al.
(Continued)

FOREIGN PATENT DOCUMENTS

JP    2011-113009    6/2011
JP    2013-120248    6/2013
(Continued)

OTHER PUBLICATIONS

International Search Report for PCT/JP2018/002540 dated Apr. 24, 2018.
Taiwanese Office Action for 106145239 dated Aug. 27, 2018.

Primary Examiner — Clayton E. LaBalle
Assistant Examiner — Diana Hancock
(74) Attorney, Agent, or Firm — IPUSA, PLLC

(57) ABSTRACT

A lens driving device includes a base, a lens holder capable of holding a lens body, a movable support, a leaf spring that is disposed on the movable support and supports the lens holder such that the lens holder is movable along an optical axis of the lens body, a suspension wire that rises from the base along the optical axis and supports the movable support such that the movable support is movable in a direction intersecting the optical axis, and a drive mechanism that moves the movable support in the direction intersecting the optical axis. The leaf spring includes a spring body fixed to the movable support, a wire fixing part to which the suspension wire is fixed, and a first beam and a second beam that are disposed between the spring body and the wire fixing part and torsionally deformable.

7 Claims, 9 Drawing Sheets

(56) References Cited

U.S. PATENT DOCUMENTS

| | | | | |
|---|---|---|---|---|
| 2013/0016427 | A1* | 1/2013 | Sugawara | G02B 27/646 |
| | | | | 359/557 |
| 2014/0177056 | A1* | 6/2014 | Hayashi | G02B 7/08 |
| | | | | 359/557 |
| 2016/0216529 | A1* | 7/2016 | Park | H04N 5/23287 |
| 2016/0313568 | A1 | 10/2016 | Ichihashi | |
| 2017/0082829 | A1* | 3/2017 | Kudo | G02B 7/04 |
| 2017/0322476 | A1* | 11/2017 | Bai | G02B 7/09 |
| 2018/0031858 | A1* | 2/2018 | Gomyo | G03B 5/04 |
| 2018/0113274 | A1* | 4/2018 | Jung | H04N 5/2253 |
| 2018/0210163 | A1* | 7/2018 | Jung | H04N 5/23287 |
| 2019/0064476 | A1* | 2/2019 | Matsuhisa | G02B 7/09 |

FOREIGN PATENT DOCUMENTS

| | | |
|---|---|---|
| JP | 2016-191849 | 11/2016 |
| JP | 2017-027017 | 2/2017 |
| TW | I435109 | 4/2014 |
| WO | 2015/178081 | 11/2015 |

* cited by examiner

LENS DRIVING DEVICE

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2018/002540, filed on Jan. 26, 2018, which is based on and claims priority to Japanese Patent Application No. 2017-020974 filed on Feb. 8, 2017, the entire contents of which are incorporated herein by reference.

BACKGROUND OF THE INVENTION

1. Field of the Invention

An aspect of this disclosure relates to a lens driving device.

2. Description of the Related Art

Japanese Laid-Open Patent Publication No. 2011-113009 discloses a technology related to a lens driving device. In the lens driving device described in Japanese Laid-Open Patent Publication No. 2011-113009, four wires (suspension wires) are fixed to a base, and a first holder is supported at the ends of the wires. The first holder includes a lens holder that holds a lens and is disposed inside of a cylindrical part of the first holder. A leaf spring is fixed to the upper end of the cylindrical part, and the upper end of the lens holder is supported by the leaf spring. The leaf spring includes buckling prevention parts protruding from the four corners of the leaf spring. The upper ends of the wires are fixed to the buckling prevention parts. In Japanese Laid-Open Patent Publication No. 2011-113009, the buckling prevention parts are made of elastic parts that are elastically deformed in the optical axis direction by a force smaller than the buckling load of the wires. When, for example, the lens driving device falls and receives an impact in the optical axis direction, the plate-shaped buckling prevention parts deform before the wires deform and thereby prevent the wires from buckling.

In Japanese Laid-Open Patent Publication No. 2011-113009, it is only assumed that an impact is applied in the optical axis direction to the suspension wires and the buckling prevention parts as a result of the falling of the lens driving device. In practice, however, the buckling prevention parts may be impacted in such a direction that the buckling prevention parts are twisted around their extending directions (directions intersecting the optical axis) instead of in the optical axis direction, and the suspension wires are broken. The buckling prevention parts of Japanese Laid-Open Patent Publication No. 2011-113009 are plate-shaped parts protruding from the corners of the leaf spring and have high torsional rigidity. Therefore, when an impact is applied in the twisting direction, the stress is concentrated on the suspension wires fixed to the buckling prevention parts rather than on the buckling prevention parts, and the suspension wires tend to be broken.

SUMMARY OF THE INVENTION

In an aspect of this disclosure, there is provided a lens driving device that includes a base, a lens holder capable of holding a lens body, a movable support, a leaf spring that is disposed on the movable support and supports the lens holder such that the lens holder is movable along an optical axis of the lens body, a suspension wire that rises from the base along the optical axis and supports the movable support such that the movable support is movable in a direction intersecting the optical axis, and a drive mechanism that moves the movable support in the direction intersecting the optical axis. The leaf spring includes a spring body fixed to the movable support, a wire fixing part to which the suspension wire is fixed, and a first beam and a second beam that are disposed between the spring body and the wire fixing part and torsionally deformable. The spring body, the wire fixing part, the first beam, and the second beam are formed as a monolithic component. Each of the first beam and the second beam includes a base part connected to the spring body, an end part connected to the wire fixing part, and a bent part that is disposed between the base part and the end part and connects the base part to the end part; two first virtual lines, each of which passes through a center of the base part of one of the first beam and the second beam, intersect with each other at a position away from the spring body; and two second virtual lines, each of which passes through a center of the end part of one of the first beam and the second beam, intersect with each other at a position away from the spring body.

DESCRIPTION OF THE PREFERRED EMBODIMENTS

Embodiments of the present invention are described below with reference to the accompanying drawings.

First Embodiment

Figure 1:
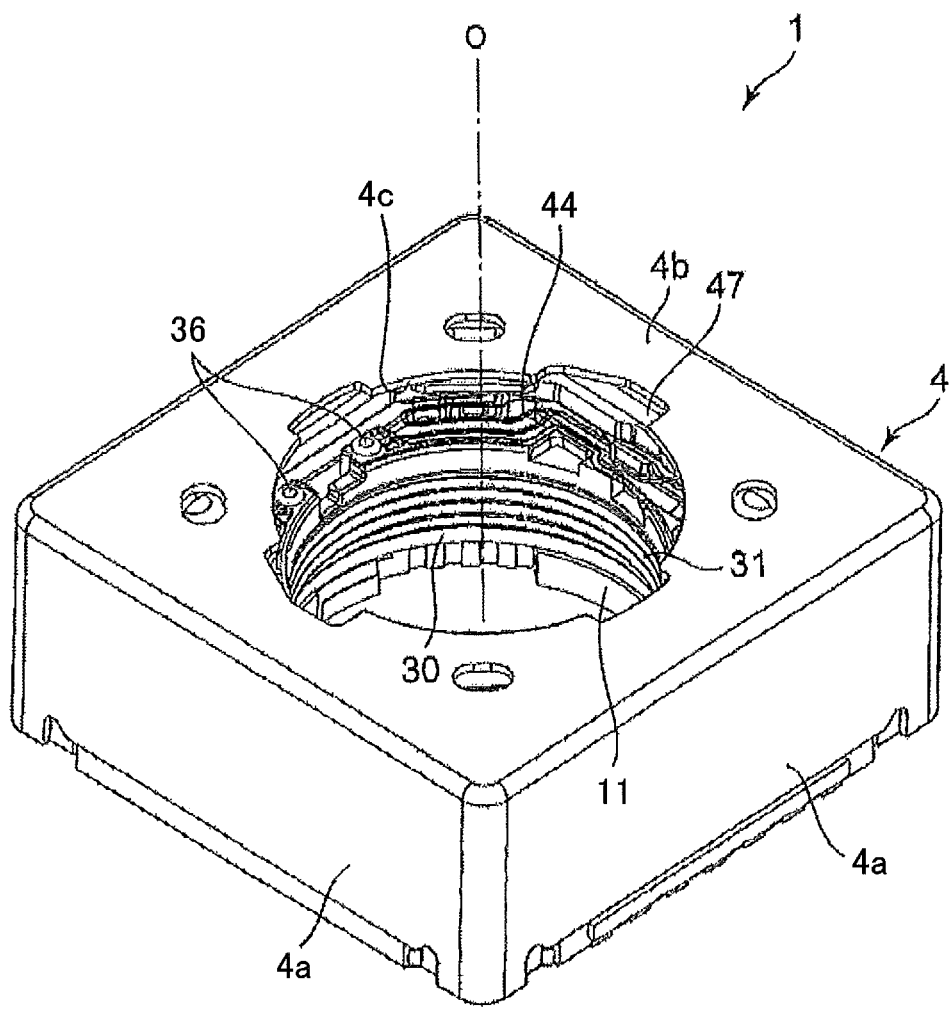
FIG. 1 is a top perspective view of a lens driving device according to a first embodiment.
Figure 1:
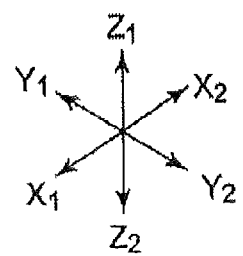

A first embodiment is described below. A lens driving device 1 illustrated in FIG. 1 is provided in, for example, a mobile phone or a mobile information terminal together with an imaging device. A lens body or lens barrel (not shown) can be placed in a lens holder 30 of the lens driving device 1 to face the imaging device. The lens holder 30 is driven along the optical axis of the lens body to perform automatic focusing, and the lens holder 30 is driven in a direction intersecting the optical axis to perform image stabilization.

In the drawings, a Z1 direction indicates an upward direction with reference to the lens driving device 1, and a Z2 direction indicates a downward direction with reference to the lens driving device 1. In other words, the Z1 direction indicates a forward direction in which an object to be captured by the imaging device exists, and the Z2 direction indicates a backward direction in which the imaging device exists. An X1-X2 direction is the first direction, and a Y1-Y2 direction is the second direction. The first direction and the second direction are orthogonal to each other, and the first direction and the second direction are orthogonal to the Z1-Z2 direction.

Figure 2:
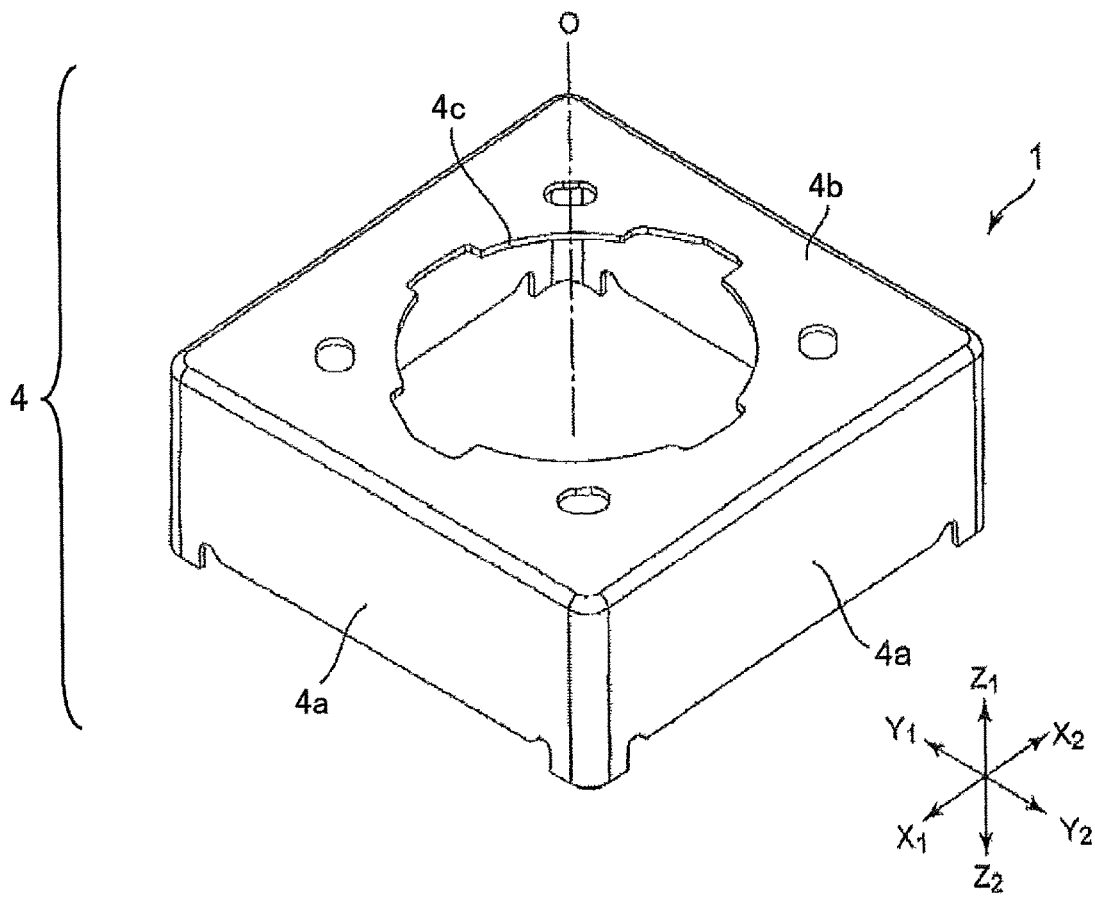
FIG. 2 is a drawing illustrating the lens driving device of FIG. 1 in a state where a cover is detached.
Figure 2:
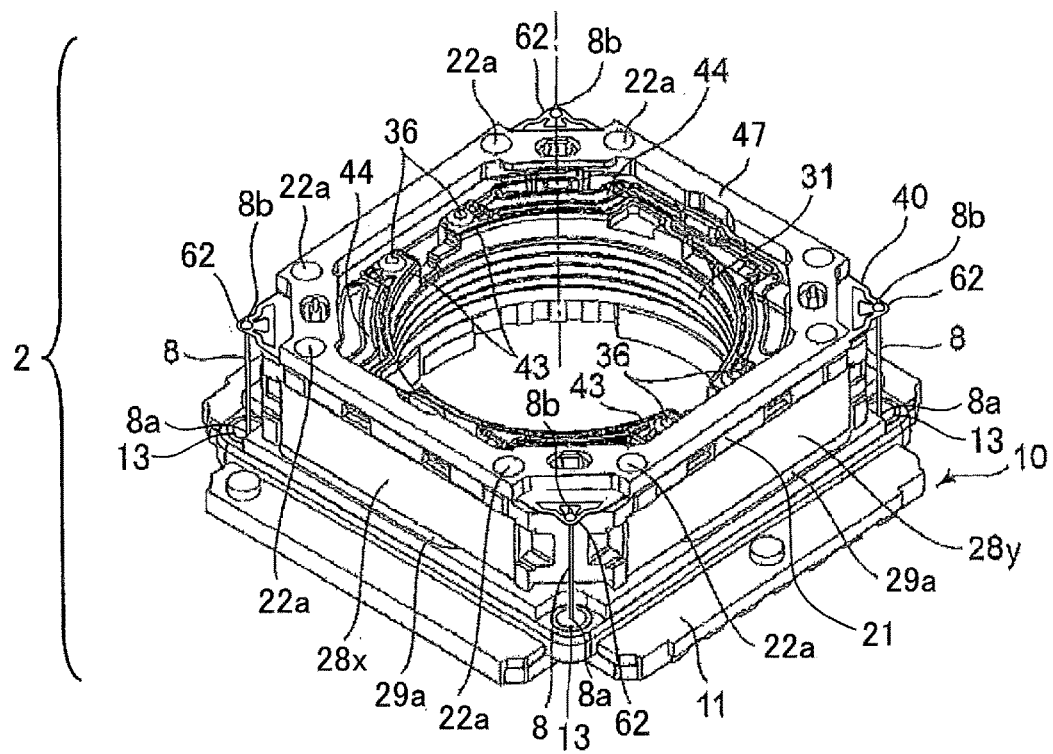
Figure 3:
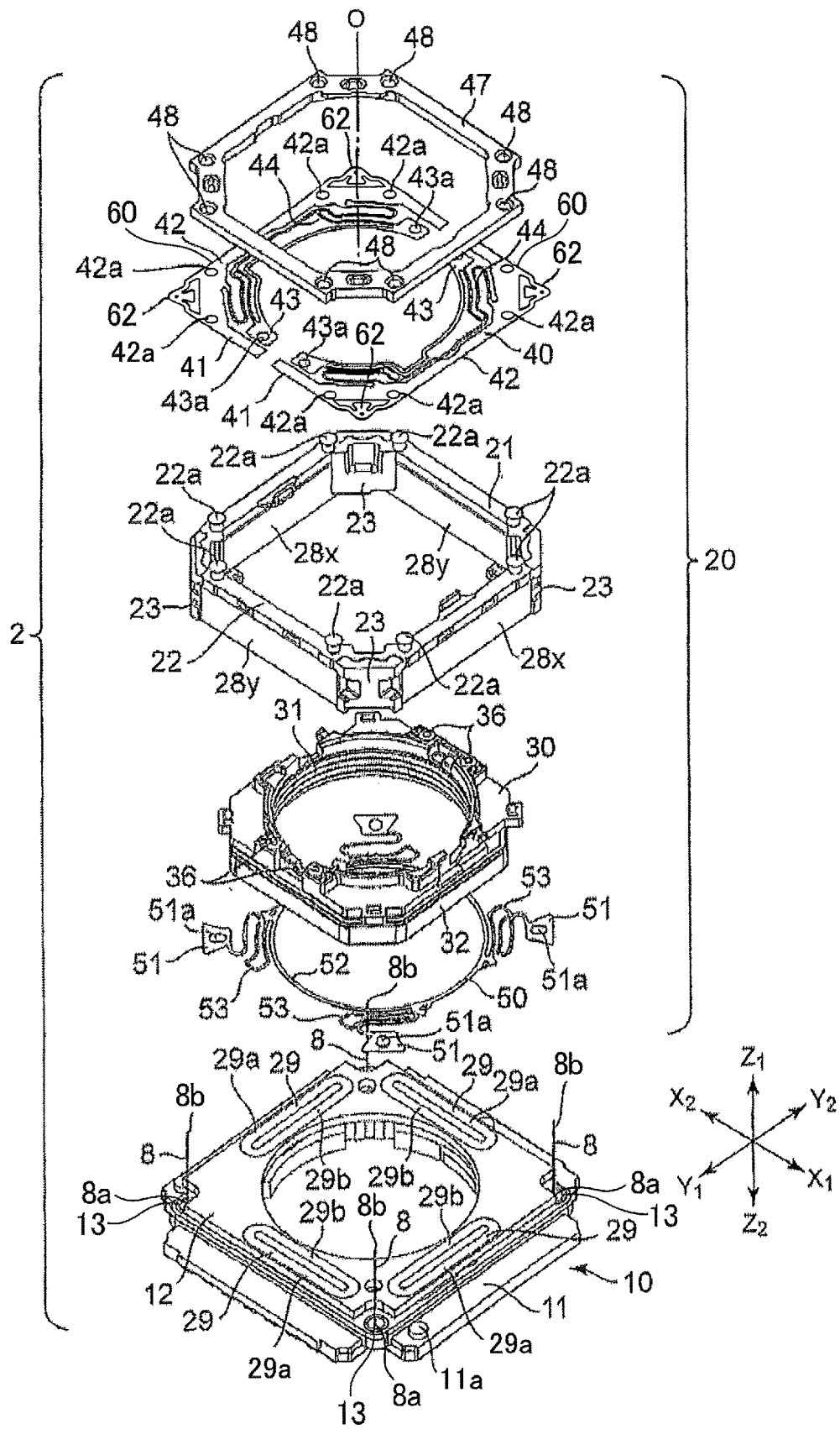
FIG. 3 is an exploded perspective view of a body of the lens driving device of FIG. 2.
Figure 4:
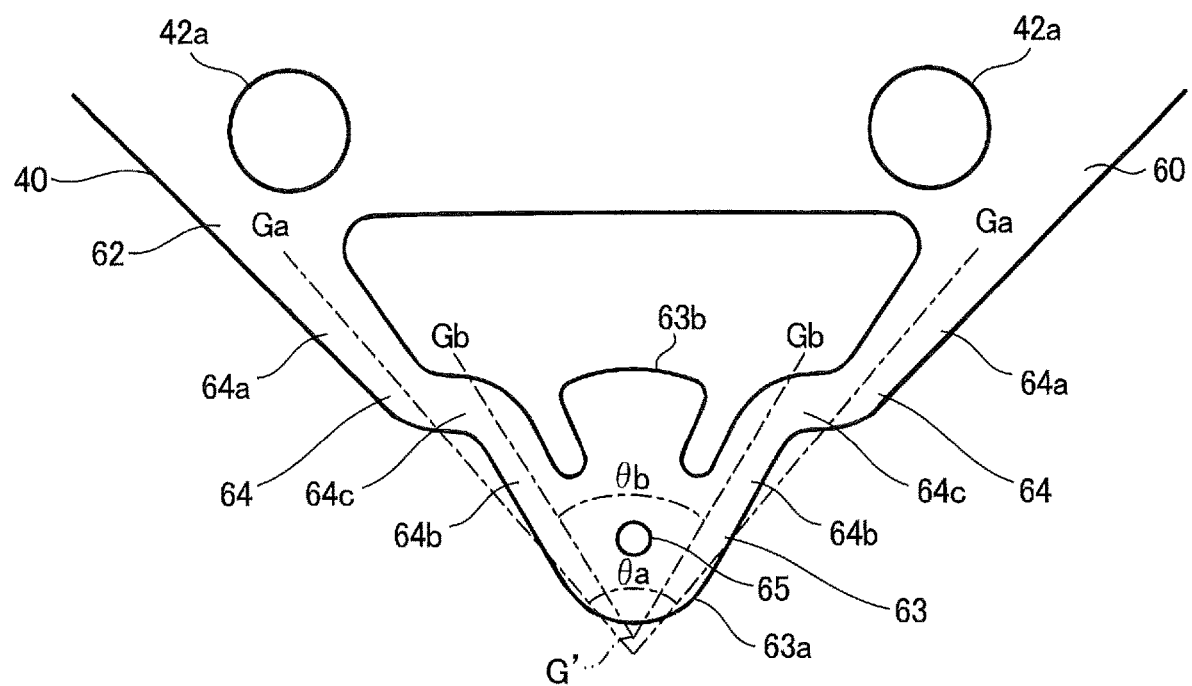
FIG. 4 is an enlarged plan view of one of four corners of a first leaf spring.
Figure 5:
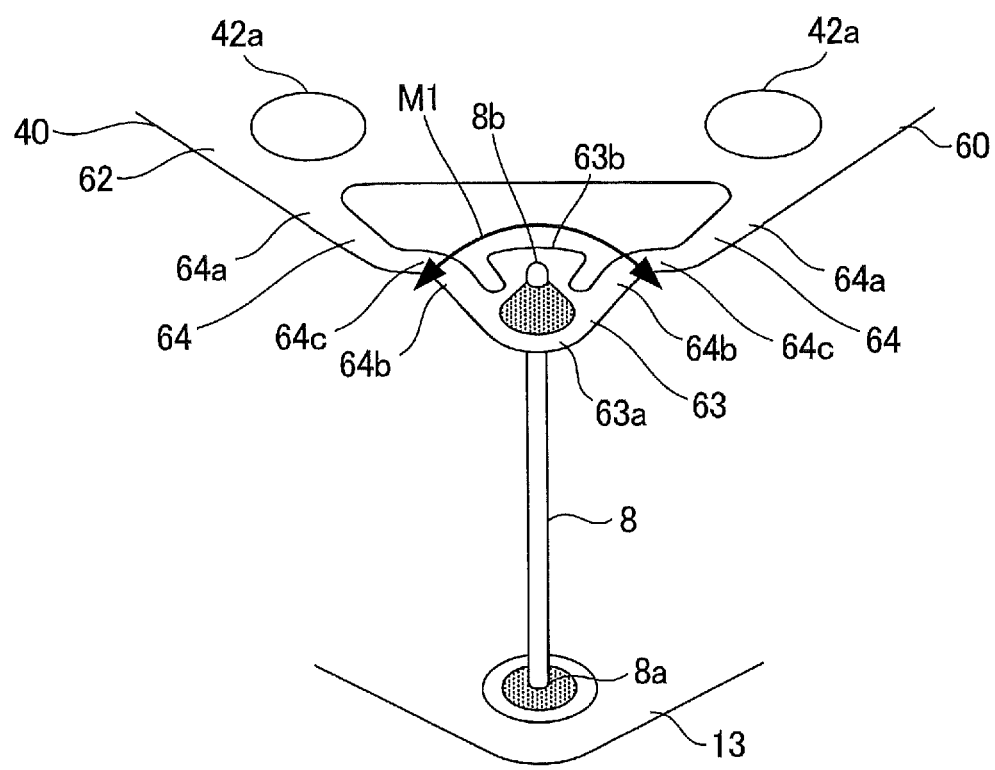
FIG. 5 is a drawing illustrating a state where a suspension wire is joined to the corner illustrated in FIG. 4.

FIG. 1 illustrates an overall structure of the lens driving device 1, and FIG. 2 illustrates the lens driving device 1 in a state where a cover 4 is detached. As illustrated in FIG. 2, the lens driving device 1 includes the cover 4 and a body 2 disposed inside of the cover 4. FIG. 3 is an exploded perspective view of the body 2. FIG. 4 is an enlarged plan view of one of four corners 62 of a first leaf spring 40 illustrated in FIG. 3. FIG. 5 is a drawing illustrating a state where a suspension wire 8 is joined to the corner 62 illustrated in FIG. 4.

In FIGS. 1 through 3, "O" indicates a center line of the lens driving device 1. When the lens body is placed in the lens holder 30 of the lens driving device 1, the center line O matches the optical axis of the lens body (lens). Hereinafter, the center line O may be referred to as an "optical axis O".

As illustrated in FIG. 3, the body 2 of the lens driving device 1 includes a base structure 10. The base structure 10 includes a base 11 comprised of a synthetic resin. A metal base 13 comprised of a metal plate and divided into multiple parts is embedded in the base 11. The metal base 13 and the base 11 are formed as a monolithic component by insert molding. Base ends (lower ends) 8a of the four suspension wires 8 are fixed to the metal base 13 by, for example, soldering, and the suspension wires 8 rise along the optical axis O. Distal ends (upper ends) 8b of the suspension wires 8 support a movable unit 20 such that the movable unit 20 can freely move in directions (orthogonal directions) intersecting the Z axis (optical axis O). The movable unit 20 includes the lens holder 30, an axial drive coil (focus coil) 32, a movable support 21, magnets 28x and 28y, a holddown part 47, the first leaf spring 40, and a second leaf spring 50.

The suspension wires 8 are formed of a conductive and highly-elastic metal material such as a copper alloy. The four suspension wires 8 constitute an elastic support part that supports the movable unit 20 such that the movable unit 20 can move in a first direction (X1-X2 direction) and a second direction (Y1-Y2 direction) that intersect the optical axis O.

As illustrated in FIG. 3, the movable unit 20 includes the movable support 21. The movable support 21 is formed of a synthetic resin material. As illustrated in FIGS. 2 and 3, the movable support 21 includes a frame 22 having a rectangular shape (a substantially square shape) in plan view, and four legs 23 extending along the optical axis from the four corners of the frame 22 in the downward direction (Z2 direction). The frame 22 and the legs 23 are formed as a monolithic component. Below the frame 22, four magnet holding recesses are formed between adjacent legs 23. Magnets 28x are held in and fixed to the magnet holding recesses that face each other in the first direction (X1-X2 direction), and magnets 28y are held in and fixed to the magnet holding recesses that face each other in the second direction (Y1-Y2 direction).

Each of the magnets 28x and 28y is magnetized such that its inner side facing the inside of the movable support 21 and its outer side facing outward have opposite magnetic poles. For example, the inner side of each of the magnets 28x and 28y has the north pole and the outer side of each of the magnets 28x and 28y has the south pole.

In the movable unit 20, the lens holder 30 is disposed inside of the movable support 21. The lens holder 30 is formed of a synthetic resin and has a cylindrical shape. A circular holding hole 31 passes through the center of the lens holder 30 in the vertical direction (along the Z-axis). Lenses for imaging are held in a lens barrel, and the lens barrel holding the lenses (lens body) can be placed in the holding hole 31. A thread groove for attaching the lens body is formed in the holding hole 31 of the lens holder 30. The method of holding (or fixing) the lens body in the lens holder 30 is not limited to screwing. For example, the lens body may be bonded to the lens holder 30 with an adhesive. In the figures of the present application, the lens and the lens barrel are omitted.

The central axis of the lens holder 30 matches the optical axis of the lens held in the lens holder 30 and also matches the center line O.

As illustrated in FIGS. 2 and 3, the first leaf spring 40 is fixed to the upper side of the movable support 21, and the second leaf spring 50 is fixed to the lower sides of the legs 23 of the movable support 21. The lens holder 30 is supported by the first leaf spring 40 and the second leaf spring 50 such that the lens holder 30 can move inside of the movable support 21 along the center line O (along the optical axis O).

As illustrated in FIG. 3, the first leaf spring 40 includes two split springs 41 that are separated from each other. Each of the split springs 41 is formed of a conductive spring metal plate such as a copper alloy plate or a phosphor bronze plate. Each split spring 41 includes a spring body 60 and two corners 62 connected to the spring body 60. The spring body 60 and the two corners 62 are formed as a monolithic component. The spring body 60 includes an outer fixing part 42, an inner fixing part 43, and a deformable spring part 44 connecting the outer fixing part 42 and the inner fixing part 43. Fixing holes 42a are formed in the outer fixing part 42, and fixing holes 43a are formed in the inner fixing part 43.

As illustrated in FIG. 4, each of the four corners 62 of the first leaf spring 40 includes a wire fixing part 63 for fixing the corresponding suspension wire 8, and two beams 64 (first beam and second beam) each of which extends from the spring body 60 in a direction intersecting the corresponding suspension wire 8 and is connected to the wire fixing part 63. The wire fixing part 63 includes a tip 63a and a heat transfer part 63b protruding from the tip 63a toward the spring body 60. A wire connection hole 65 is formed in the tip 63a. As illustrated in FIG. 2, the four corners 62 of the first leaf spring 40 protrude from the corresponding corners of the rectangular movable support 21.

As illustrated in FIG. 5, when assembling the base structure 10 and the movable unit 20, the distal end 8b of each suspension wire 8 is inserted into the wire connection hole 65 of the wire fixing part 63. At this step, paste solder (cream solder) is applied between the distal end 8b of the suspension wire 8 and the tip 63a of the wire fixing part 63, and the heat transfer part 63b of the wire fixing part 63 is irradiated with a laser beam to heat the wire fixing part 63. As a result, heat is transferred from the heat transfer part 63b to the tip 63a, the solder is melted, and the distal end 8b of the suspension wire 8 and the wire fixing part 63 are soldered and fixed.

As illustrated in FIG. 3, fixing protrusions 22a are seamlessly formed on the upper surface of the frame 22 of the movable support 21. A holddown part 47 is provided as an uppermost part of the movable unit 20. The holddown part 47 is shaped like a quadrangular (rectangular) frame, and two fixing holes 48 are formed in each corner of the holddown part 47.

The outer fixing part 42 formed in the split spring 41 of the first leaf spring 40 is placed on the upper surface of the frame 22 of the movable support 21, and the holddown part 47 is placed on the outer fixing part 42. The fixing protrusions 22a protruding from the upper surface of the frame 22 of the movable support 21 are inserted into the fixing holes 42a formed in the outer fixing parts 42 of the split springs 41, and are further inserted into the fixing holes 48 of the holddown part 47. The ends of the fixing protrusions 22a in the fixing holes 48 are fixed to the holddown part 47 by cold riveting, hot riveting, or bonding. As a result, the outer fixing parts 42 of the split springs 41 are sandwiched and fixed between the movable support 21 and the holddown part 47.

As illustrated in FIG. 3, fixing protrusions 36 are seamlessly formed on the upper side of the lens holder 30. The inner fixing parts 43 of the split springs 41 are placed on the upper surface of the lens holder 30, and the fixing protrusions 36 are inserted into the fixing holes 43a and fixed to the inner fixing parts 43 by cold riveting or hot riveting. That is, on the upper side of the lens holder 30, the first leaf spring 40 (split springs 41) is provided to join the lens holder 30 and the movable support 21 together. With this configuration, the upper side of the lens holder 30 is supported by the movable support 21 via the first leaf spring 40.

Referring to FIG. 2, when the outer fixing parts 42 of the split springs 41 are fixed to the upper surface of the frame 22 of the movable support 21, the wire connectors (the wire fixing parts 63) of the split springs 41 protrude outward from four corners of the movable support 21 and the holddown part 47. The distal ends 8b of the suspension wires 8 whose base ends 8a are fixed to the base 11 are inserted into the wire connection holes 65 formed in the wire connectors (the wire fixing parts 63) and fixed to the split springs 41 by soldering. As a result, the movable unit 20 including the movable support 21, the holddown part 47, and the lens holder 30 becomes movable above the base 11 in directions intersecting the center line (optical axis) O.

As illustrated in FIG. 3, the second leaf spring 50 is formed as a monolithic component with a metal plate having a spring property, and includes outer fixing parts 51, an inner fixing part 52, and spring deformation parts 53 joining the outer fixing parts 51 and the inner fixing part 52 together. The outer fixing parts 51, the inner fixing part 52, and the spring deformation parts 53 are formed as a monolithic component. Outer fixing holes 51a are formed in the respective outer fixing parts 51, protrusions (not shown) formed on the lower end faces (which face the Z2 direction) of the four legs 23 of the movable support 21 are inserted into the outer fixing holes 51a, and the protrusions are riveted so that the outer fixing parts 51 are fixed to the lower end faces of the legs 23. The inner fixing part 52 is fixed to the lower surface of the lens holder 30 with, for example, an adhesive. That is, the second leaf spring 50 is provided to join the lower side of the lens holder 30 to the lower side of the movable support 21.

The upper side and the lower side of the lens holder 30 are supported by the first leaf spring 40 and the second leaf spring 50. With this configuration, the lens holder 30 can move upward and downward along the center line O (the optical axis of the lens) inside the movable support 21.

As illustrated in FIG. 3, the axial drive coil 32 is wound around the outer circumference of the cylindrical lens holder 30 to surround the cylindrical lens holder 30. The axial drive coil 32 is wound in a direction in which the conductor surrounds the center line O, and a control current supplied to the axial drive coil 32 flows in a direction that intersects the center line O.

One end of the conductor forming the axial drive coil 32 is connected to one of the split springs 41 of the first leaf spring 40 by soldering, and the other end of the conductor is connected to the other one of the split springs 41 by soldering. A control current is supplied via the suspension wires 8 and the split springs 41 to the axial drive coil 32.

The axial drive coil 32 has an octagonal shape in plan view. The axial drive coil 32 faces the inner side of each of the magnets 28x via a gap. Similarly, the axial drive coil 32 faces the inner side of each of the magnets 28y via a gap.

In the present embodiment, the axial drive coil 32, the magnets 28x, and the magnets 28y constitute an axis-direction drive mechanism for moving the lens holder 30 in the optical axis direction.

As illustrated in FIG. 3, the base structure 10 includes an insulating substrate 12 fixed on the base 11. Axis-intersecting drive coils 29 are provided at four positions on the upper surface of the insulating substrate 12. Each axis-intersecting drive coil 29 is formed of a thin film such as copper foil on the surface of the insulating substrate 12. The axis-intersecting drive coil 29 forms an elongated spiral pattern along a plane, and includes an outer electromagnetic effector 29a disposed in a position away from the center line O and an inner electromagnetic effector 29b disposed in a position close to the center line O.

When the movable unit 20 is supported by the suspension wires 8 fixed to the base 11, as illustrated in FIG. 2, the lower end face of each of the four magnets 28x and 28y fixed to the movable support 21 faces the outer electromagnetic effector 29a of the axis-intersecting drive coil 29 via a gap. The axis-intersecting drive coil 29 and the magnets 28x and 28y constitute an axis-intersecting drive mechanism (magnetic drive mechanism) for moving the movable unit 20 in directions intersecting the center line O. That is, the axis-intersecting drive mechanism is a drive mechanism for moving the movable support 21 in directions intersecting the optical axis O. The axis-intersecting drive mechanism is an image stabilization mechanism.

Although omitted in the figures, position detecting devices are provided on the insulating substrate 12. The position detecting devices are Hall elements or magnetoresistance elements. At least two position detecting devices are mounted on the lower surface of the insulating substrate 12. One of the position detecting devices is disposed to face the lower end face of one of the magnets 28x across the insulating substrate 12, and the other one of the position detecting devices is disposed to face the lower end face of one of the magnets 28y across the insulating substrate 12.

As illustrated in FIGS. 1 and 2, the lens driving device 1 includes the cover 4 for covering the body 2. The cover 4 is formed of, for example, a nonmagnetic stainless steel plate. The cover 4 has a cubic shape, and includes four side plates 4a and a ceiling plate 4b disposed on the upper sides (the Z1 sides) of the side plates 4a. The side plates 4a and the ceiling plate 4b are formed as a monolithic component. A substantially circular window 4c is formed in the ceiling plate 4b to allow light to pass therethrough. The lower edges of the side plates 4a are in contact with the upper surface of the base 11 constituting a part of the base structure 10 of the body 2, and the cover 4 is fixed to the base 11 with, for example, an adhesive.

Next, operations of the lens driving device 1 with the above configuration are described. In the lens driving device 1, separate conducting paths are formed from the respective suspension wires 8 via the split springs 41 of the first leaf spring 40 to the ends of the conductors of the axial drive coil 32, and a control current is supplied via the conducting paths to the axial drive coil 32.

When a control current is supplied to the axial drive coil 32 constituting the axis-direction drive mechanism, the lens holder 30 is moved along the center line O in the movable support 21 by the current flowing through the axial drive coil 32 and the magnetic field generated by the magnets 28x and 28y. An imaging device is provided behind the base structure 10 (in the Z2 direction), and focusing for the imaging device is performed by moving the lens holder 30 along the center line O.

Next, in the axis-intersecting drive mechanism, a control current is supplied to the axis-intersecting drive coils 29 formed on the surface of the insulating substrate 12. As a result, the movable unit 20 being supported by the suspension wires 8 is moved in a direction intersecting the center line O mainly by the current flowing through the outer electromagnetic effector 29a of each of the axis-intersecting drive coils 29 and a magnetic flux extending from the inner side to the outer side below each of the magnets 28x and 28y. The amount of movement of the movable unit 20 in a direction intersecting the center line O is detected by a position detecting device provided on the insulating substrate 12, and the detection signal of the position detecting device is fed back to control the rate of the control current supplied to the axis-intersecting drive coil 29. For example, image stabilization is performed during image capturing by using the above control process.

As illustrated in FIGS. 4 and 5, the movable unit 20 is supported on the base 11 via the suspension wires 8 fixed to the wire fixing parts 63 of the four corners 62 of the first leaf spring 40. Accordingly, when the lens driving device 1, for example, falls and receives an external impact, the movable unit 20 moves undesirably and a large force is applied to the suspension wires 8 and the four corners 62 of the first leaf spring 40. In such a case, a force in the torsional direction as indicated by an arrow in FIG. 5 is likely to be applied to the corner 62 of the first leaf spring 40. Therefore, if the torsional rigidity of the corner 62 is high, the suspension wire 8 may be broken.

For the above reason, in the present embodiment, the corner 62 of the first leaf spring 40 is configured to have low torsional rigidity so that the stress at the time of impact can be dispersed and the suspension wire 8 and the corner 62 are prevented from being broken. That is, as illustrated in FIGS. 4 and 5, two beams 64 are formed in each corner 62 of the first leaf spring 40, and the wire fixing part 63 is seamlessly formed at the ends of the two beams 64. With this configuration, the torsional rigidity of the wire fixing part 63 is reduced, and the wire fixing part 63 can more readily bend in the Z direction. As a result, the suspension wire 8 can readily bend and deform.

As a preferable configuration, each of the beams 64 includes a base part 64a (base beam) connected to the spring body 60, an end part 64b (end beam) connected to the wire fixing part 63, and a bent part 64c that is located between the base part 64a and the end part 64b and connects the base part 64a to the end part 64b. The spring body 60 is a part of the first leaf spring 40 fixed to the movable support 21. The two beams 64 (the first beam and the second beam) are connected to different parts of the spring body 60 that are apart from each other, and extend toward the same wire fixing part 63. The bent parts 64c are formed in the middle of the corresponding beams 64 and are bent such that the two beams 64 extending from the spring body 60 to the wire fixing part 63 come close to each other.

Figure 6:
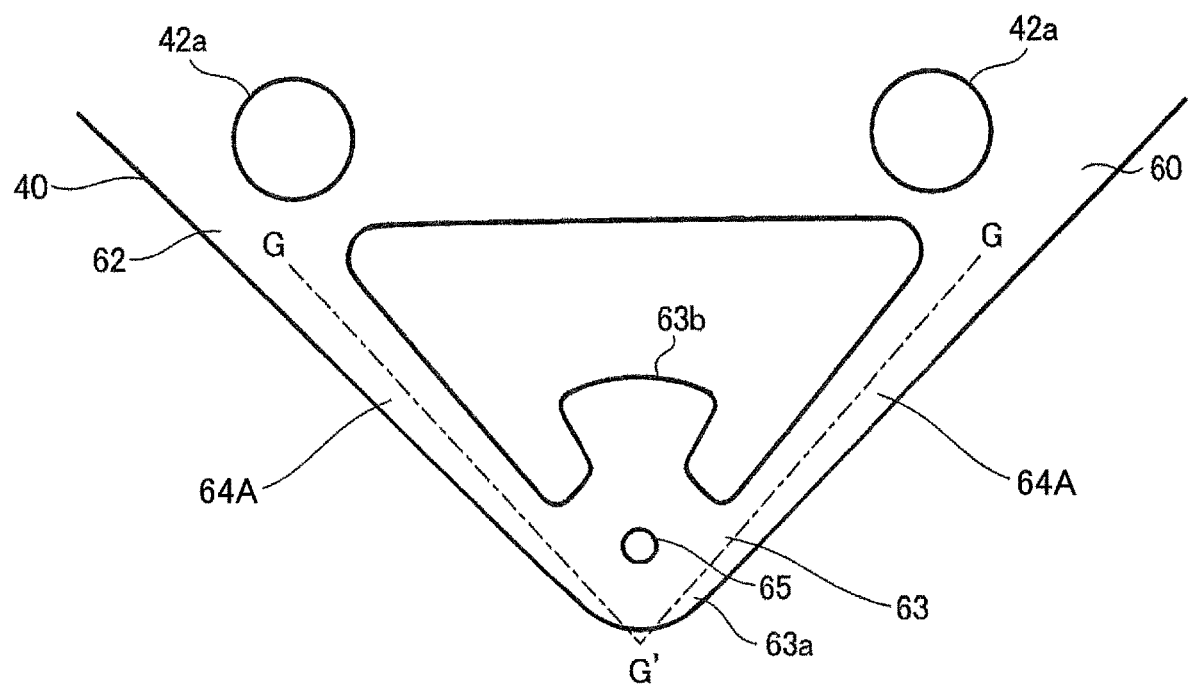
FIG. 6 is an enlarged plan view of a corner of a first leaf spring according to a comparative example.
Figure 7:
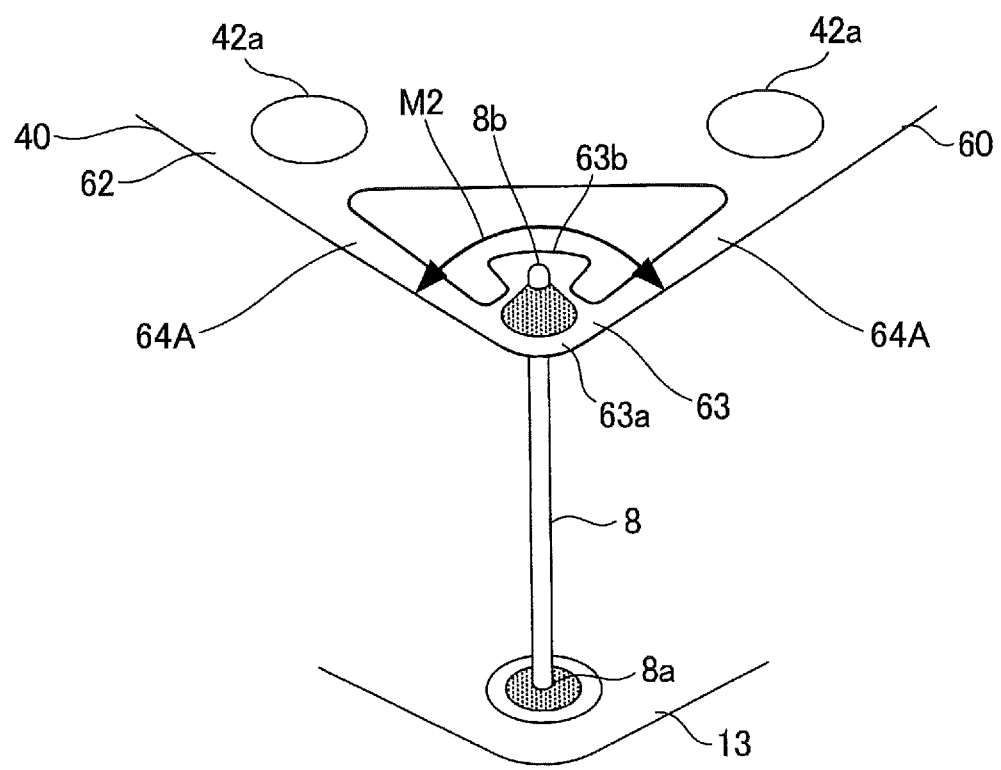
FIG. 7 is a drawing illustrating a state where a suspension wire is joined to the corner illustrated in FIG. 6.

Effects of the configuration of the present embodiment where the bent parts 64c are provided in the beams 64 are described below through comparison with a comparative example where the bent parts 64c are not provided in the beams. FIG. 6 is an enlarged plan view of a corner 62 of a first leaf spring 40 according to a comparative example where no bent part 64c is provided in beams 64A. FIG. 7 is a drawing illustrating a state where the suspension wire 8 is joined to the corner 62 illustrated in FIG. 6.

In the present embodiment, as illustrated in FIG. 4, the bent part 64c is provided in the beam 64. With this configuration, as illustrated in FIG. 5, when a torsional moment M1 around the wire connection hole 65 of the wire fixing part 63 is applied to the corner 62, the torsional force applied to each of the beams 64 can be distributed to the end part 64b, the base part 64a, and the bent part 64c, and the torsional rigidity of the beams 64 can be reduced. As a result, even when the bending deflextion amount of the suspension wire 8 is expected to increase due to, for example, an impact, because the beam 64 is more readily deformable by torsion, the bending load applied to the suspension wire 8 is reduced. This in turn makes it possible to suppress an increase in the internal stress of the suspension wire 8, and to suppress the breakage and fatigue of the suspension wire 8.

In contrast, because the bent part 64c is not provided in the beams 64A of the comparative example illustrated in FIG. 6, when a torsional moment M2 around the wire connection hole 65 of the wire fixing part 63 is applied to the corner 62 as illustrated in FIG. 7, a torsional force in the same direction is applied to the entire length of each of the beams 64A. With this configuration, the bending rigidity of the beams 64A becomes higher than the bending rigidity of the beams 64 of the embodiment illustrated in FIGS. 4 and 5. Therefore, when the bending deflection amount of the suspension wire 8 increases due to, for example, an impact, because the beam 64A cannot be readily deformed by torsion, a large bending load is instead applied to the suspension wire 8. This in turn increases the risk of breakage and fatigue of the suspension wire 8 due to an increase in the internal stress of the suspension wire 8.

Effects of the present embodiment are described in more detail below. In FIG. 4, a first virtual line Ga passing through the center of the base part 64a and a second virtual line Gb passing through the center of the end part 64b are drawn for each beam 64. Two first virtual lines Ga intersect each other at a position away from the spring body 60, and two second virtual lines Gb intersect each other at a position away from the spring body 60. The two second virtual lines Gb are located inside of the two first virtual lines Ga. An angle θb (second angle) formed between the second virtual lines Gb passing through the two end parts 64b is smaller than an angle θa (first angle) formed between the first virtual lines Ga passing through the two base parts 64a.

In the present application, the first virtual line Ga on each beam 64 is a straight line formed by connecting center points that are set at multiple positions along the longitudinal direction of the base part 64a such that each of the center points bisects the beam 64 in the width direction. When the center points are not arranged linearly, the first virtual line Ga is a straight line that is formed such that the distances between the straight line and the respective center points are minimized. This also applies to the relationship between the second virtual line Gb and the end part 64b of each beam 64.

When the torsional moment M1 around the wire connection hole 65 of the wire fixing part 63 is applied to the corner 62, a torsional force is applied to the two end parts 64b that are arranged such that the distance between the two end parts 64b increases toward the spring body 60. In each beam 64, because the second virtual line Gb passing through the center of the end part 64b is at a distance from the first virtual line Ga passing through the center of the base part 64a in the X-Y plane, a moment corresponding to this distance is applied to the bent part 64c and the base part 64a. Therefore, the base part 64a becomes comparatively readily deformable by torsion, and bending deflection occurs in the bent part 64c. As a result, the bending rigidity of the entire beam 64 is reduced. Accordingly, the beams 64 become readily deformable by torsion when, for example, they are impacted. This in turn makes it possible to reduce the bending stress applied to the suspension wire 8.

Also, in each beam 64, each of the base part 64a and the end part 64b is configured such that its width decreases toward its end (as the distance from the spring body 60 increases). With this configuration, when the torsional moment M1 is applied to the wire connection hole 65, the internal stress due to the torsional deformation can be made uniform at the end part and the base part, and plastic deformation and fatigue of the beam 64 can be prevented.

In the embodiment illustrated by FIGS. 4 and 5, the wire connection hole 65 is located closer to the spring body 60 than an intersection point between the two first virtual lines Ga and an intersection point G' between the two second virtual lines Gb. This configuration makes it possible to reduce the distance by which the corner 62 protrudes toward the intersection point G'.

Figure 8:
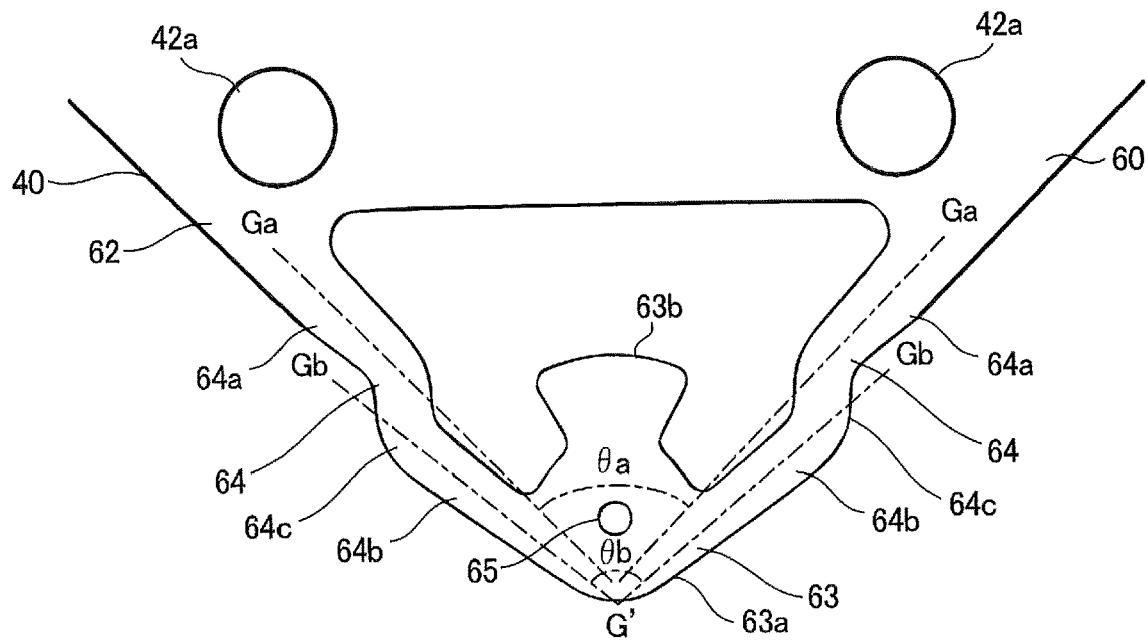
FIG. 8 is an enlarged plan view of one of the corners of a first leaf spring according to a variation of the first embodiment.

FIG. 8 is an enlarged plan view of one of corners 62 of a first leaf spring 40 according to a variation of the first embodiment. FIG. 8 corresponds to FIG. 4.

In the variation illustrated in FIG. 8, the second virtual line Gb passing through the center of the end part 64b is located outside of the first virtual line Ga passing through the center of the base part 64a. Accordingly, the angle θb between two second virtual lines Gb is greater than the angle θa between two first virtual lines Ga. The wire connection hole 65 is formed in a position that is closer to the spring body 60 than the intersection point between the two first virtual lines Ga and the intersection point G' between the two second virtual lines Gb.

Also with the configuration of the variation illustrated in FIG. 8, when the torsional moment M1 around the wire connection hole 65 is applied to the corner 62, the base part 64a of the beam 64 is readily deformed by torsion, and the bent part 64c is readily bent and deflected. Thus, the torsional rigidity of the entire beam 64 is reduced. Comparing FIGS. 4 and 8, because the angle θb in FIG. 4 between the second virtual lines Gb, each of which passes through the center of the end part 64b of the corresponding beam 64, is less than the angle θb in FIG. 8, the overall bending rigidity of the two end parts 64b in the first embodiment illustrated in FIG. 4 is slightly lower than that in the variation illustrated in FIG. 8. In a device where the corner 62 needs to be flexibly deformable, the first embodiment illustrated in FIG. 4 is more preferable than the variation illustrated in FIG. 8.

Second Embodiment

Figure 9:
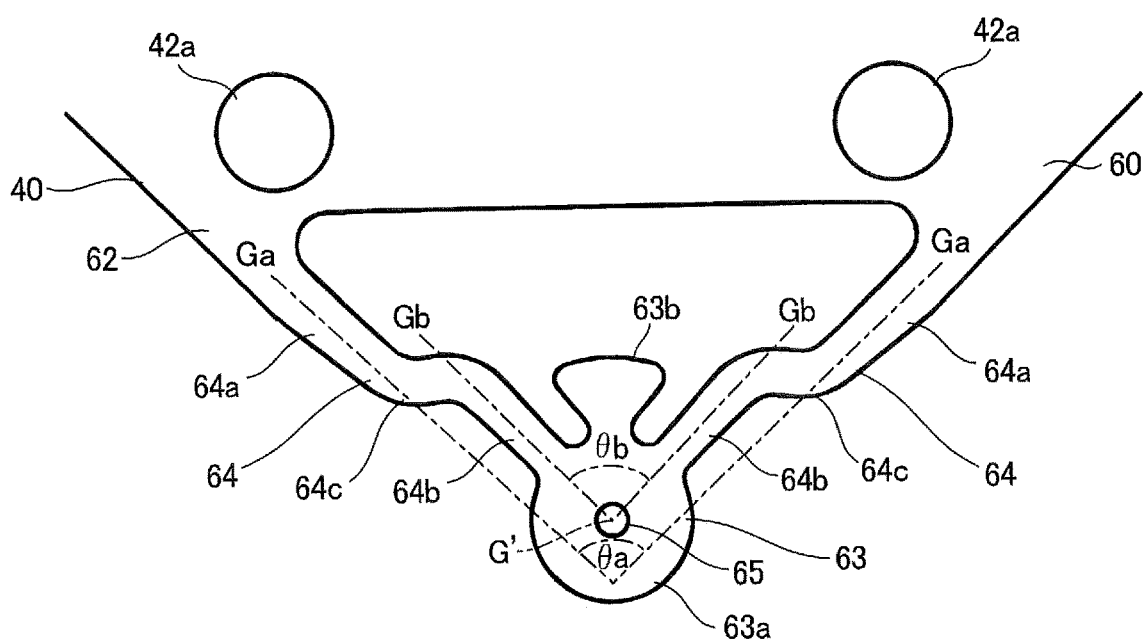
FIG. 9 is an enlarged plan view of one of the corners of a first leaf spring according to a second embodiment.

Next, a second embodiment is described. FIG. 9 is an enlarged plan view of one of corners 62 of a first leaf spring 40 in a lens driving device 1 according to the second embodiment. FIG. 9 corresponds to FIG. 4.

As illustrated in FIG. 9, in the second embodiment, the wire connection hole 65 is located at the intersection G' between the second virtual lines Gb on the end parts 64b of the two beams 64. Comparing the second embodiment illustrated in FIG. 9 with the first embodiment in FIG. 4 where the wire connection hole 65 is located inside of the intersection G', the beams 64 in FIG. 9 are more readily bent and deformed than the beams 64 in FIG. 4 when the same torsional moment M1 is applied to the wire connection hole 65. In the first embodiment illustrated in FIG. 4, because the point of application of the torsional moment M1 applied to the wire connection hole 65 is located inside of the triangle formed by the two second virtual lines Gb, the torsional moment M1 applied to the wire connection hole 65 is less likely to apply a torsional force to the two end parts 64b. In contrast, in the second embodiment illustrated in FIG. 9, because the wire connection hole 65 is located on the two second virtual lines Gb, the torsional moment M1 applied to the wire connection hole 65 is more likely to apply a torsional force to the two end parts 64b.

Figure 10:
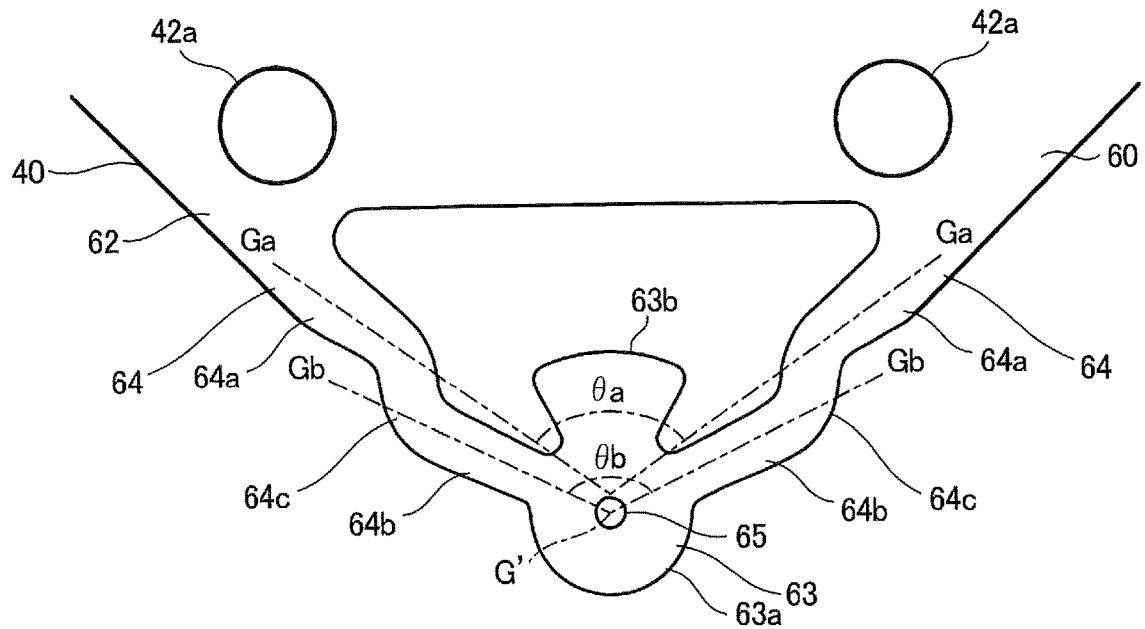
FIG. 10 is an enlarged plan view of one of the corners of a first leaf spring according to a variation of the second embodiment.

FIG. 10 is an enlarged plan view of one of corners 62 of a first leaf spring 40 according to a variation of the second embodiment. FIG. 10 corresponds to FIG. 8.

Also with the configuration of FIG. 10, because the wire connection hole 65 is located at the intersection point G' between the second virtual lines Gb on the end parts 64b of the two beams 64, the two beams 64 are readily torsionally deformed by the torsional moment M1 applied to the wire connection hole 65.

Figure 11:
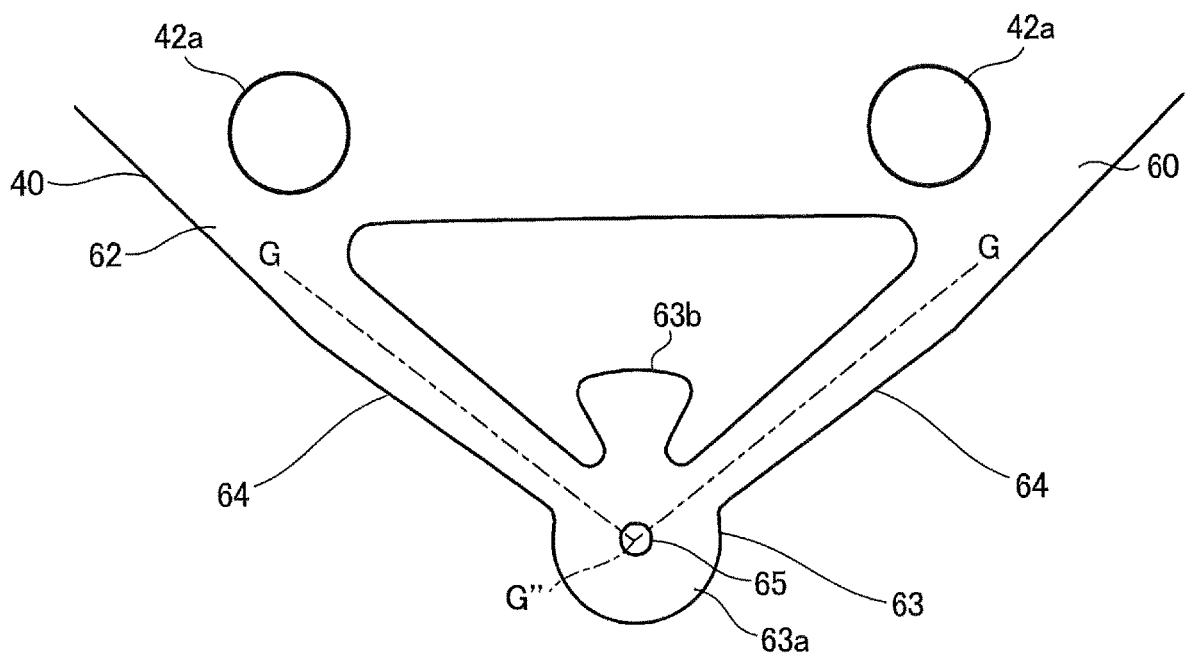
FIG. 11 is an enlarged plan view of one of the corners of a first leaf spring according to another variation of the second embodiment.

In the configurations illustrated in FIGS. 8 and 10, the beam 64 includes the bent part 64c. However, the present invention is not limited to these configurations, and the second embodiment may be applied to a configuration as illustrated in FIG. 6 where the beam 64A includes no bent part 64c. For example, in a configuration illustrated in FIG. 11, the beam 64 does not include the bent part 64c, but the wire connection hole 65 is located at an intersection G" between virtual lines G extending along the longitudinal directions of the beams 64. Even with this configuration, compared with a configuration where the wire connection hole 65 is not located at the intersection G", the wire fixing part 63 is more readily distorted.

In the first and second embodiments described above, one bent part 64c is formed in each beam 64. However, multiple bent parts may be formed in each beam 64.

Also, although the metal base 13 is embedded in the base 11 that supports the suspension wires 8 so as to rise along the optical axis O, the present invention is not limited to this configuration. For example, the insulating substrate 12 or a printed circuit board stacked on the insulating substrate 12 may be used as a base. Further, according to an embodiment, a plate-shaped insulating part with no metal base embedded may be used as a base, and the base ends (lower ends) 8a of the suspension wires 8 may be soldered or bonded with a conductive adhesive to a flexible printed circuit board (FPC board) stacked on the insulating part. In this case, the FPC board and the insulating part constitute the base. Also, only the FPC board may be used as the base.

An aspect of this disclosure makes it possible to provide a lens driving device configured such that wire fixing parts are readily deformed in a torsional direction when receiving an external impact, and suspension wires supporting a movable support are prevented from being broken.

Lens driving devices according to embodiments of the present invention are described above. However, the present invention is not limited to the specifically disclosed embodiments, and variations and modifications may be made without departing from the scope of the present invention.

What is claimed is:

1. A lens driving device, comprising:
a base;
a lens holder capable of holding a lens body;
a movable support;
a leaf spring that is disposed on the movable support and supports the lens holder such that the lens holder is movable along an optical axis of the lens body;
a suspension wire that rises from the base along the optical axis and supports the movable support such that the movable support is movable in a direction intersecting the optical axis; and
a drive mechanism that moves the movable support in the direction intersecting the optical axis, wherein
the leaf spring includes
a spring body fixed to the movable support,
a wire fixing part to which the suspension wire is fixed, and
a first beam and a second beam that are disposed between the spring body and the wire fixing part and torsionally deformable, the spring body, the wire fixing part, the first beam, and the second beam being formed as a monolithic component;
each of the first beam and the second beam includes a base part connected to the spring body, an end part connected to the wire fixing part, and a bent part that is disposed between the base part and the end part and connects the base part to the end part; two first virtual lines,
each of which passes through a center of the base part of one of the first beam and the second beam, intersect with each other at a first position away from the spring body; and
two second virtual lines, each of which passes through a center of the end part of one of the first beam and the second beam, intersect with each other at a second position away from the spring body,
wherein a first angle between the first virtual lines differs from a second angle between the second virtual lines, and each of the first angle and the second angle is more than 0 degree and less than 180 degrees.

2. The lens driving device as claimed in claim 1, wherein the second virtual lines are located inside of the first virtual lines.

3. The lens driving device as claimed in claim 2, wherein a first angle between the first virtual lines is greater than a second angle between the second virtual lines.

4. The lens driving device as claimed in claim 1, wherein the second virtual lines are located outside of the first virtual lines.

5. The lens driving device as claimed in claim 4, wherein a first angle between the first virtual lines is less than a second angle between the second virtual lines.

6. The lens driving device as claimed in claim 1, wherein
the wire fixing part includes a wire connection hole into which the suspension wire is inserted; and
the wire connection hole is disposed at an intersection between the second virtual lines.

7. The lens driving device as claimed in claim 1, wherein
the wire fixing part includes a wire connection hole into which the suspension wire is inserted; and
the wire connection hole is disposed at a position closer to the spring body than an intersection between the second virtual lines.

* * * * *